(12) United States Patent (10) Patent No.: US 12,686,278 B2
Flaum et al. (45) Date of Patent: Jul. 21, 2026

(54) METHOD AND DEVICE FOR ACTUATING AN ELECTRICAL DRIVE OF A TRAILER VEHICLE

(71) Applicant: ZF CV Systems Global GmbH, Bern (CH)

(72) Inventors: Nikolai Flaum, Hannover (DE); Johannes Heseding, Hannover (DE); Janik Ricke, Uetze (DE); Torsten Wallbaum, Duingen (DE)

(73) Assignee: ZF CV Systems Global GmbH, Bern (CH)

( * ) Notice: Subject to any disclaimer, the term of this patent is extended or adjusted under 35 U.S.C. 154(b) by 862 days.

(21) Appl. No.: 17/935,251

(22) Filed: Sep. 26, 2022

(65) Prior Publication Data

US 2023/0020585 A1 Jan. 19, 2023

Related U.S. Application Data

(63) Continuation of application No. PCT/EP2021/057213, filed on Mar. 22, 2021.

(30) Foreign Application Priority Data

Mar. 26, 2020 (DE) ..................... 10 2020 108 391.2

(51) Int. Cl.
B60K 28/16 (2006.01)
B60L 3/10 (2006.01)
B60L 15/38 (2006.01)

(52) U.S. Cl.
CPC .............. B60L 3/102 (2013.01); B60L 15/38 (2013.01); B60L 2200/28 (2013.01); B60L 2240/12 (2013.01)

(58) Field of Classification Search
CPC ...... B60L 3/102; B60L 2240/12; B60L 15/38; B60L 2200/28
(Continued)

(56) References Cited

U.S. PATENT DOCUMENTS

2013/0144480 A1* 6/2013 Kobayashi .............. G06F 17/00
701/22
2015/0060160 A1 3/2015 Kerschl et al.
(Continued)

FOREIGN PATENT DOCUMENTS

DE 10 2018 121 439 A1 3/2020
EP 2 842 814 A1 3/2015
(Continued)

OTHER PUBLICATIONS

EP 3216333 with original. Paragraphs added (Year: 2025).*
(Continued)

*Primary Examiner* — John Olszewski
*Assistant Examiner* — Nathaniel William Watkins
(74) *Attorney, Agent, or Firm* — Walter Ottesen, P.A.

(57) ABSTRACT

The disclosure relates to a method for actuating an electric drive of a trailer vehicle with a towing vehicle, including the steps: determining a current slip of at least one driven wheel of a towing vehicle pulling the trailer vehicle, determining an expected slip for the driven wheel of the towing vehicle, determining an acceleration demand depending on the determined current slip and the determined expected slip and actuating the electric drive depending on the acceleration demand. The disclosure also relates to a control unit for executing the method, a towing vehicle, a trailer vehicle and a vehicle combination.

20 Claims, 3 Drawing Sheets

(58) Field of Classification Search

USPC ........................................................ 180/197

See application file for complete search history.

(56)    References Cited

U.S. PATENT DOCUMENTS

| | | | |
|---|---|---|---|
| 2015/0120103 A1 | 4/2015 | Keys, II et al. | |
| 2015/0151737 A1* | 6/2015 | Birch ................... | B60W 10/08 |
| | | | 180/65.265 |
| 2015/0232093 A1* | 8/2015 | Fairgrieve ............. | B60W 10/18 |
| | | | 701/90 |
| 2015/0251658 A1* | 9/2015 | Kato ....................... | B60L 3/102 |
| | | | 701/22 |
| 2017/0129558 A1 | 5/2017 | Gugel et al. | |
| 2017/0210414 A1* | 7/2017 | Sato ....................... | B60W 10/20 |
| 2018/0236994 A1 | 8/2018 | Healy et al. | |
| 2018/0304944 A1* | 10/2018 | Wright ................... | B62D 53/08 |
| 2018/0340600 A1* | 11/2018 | Walter .................... | F16D 48/06 |
| 2019/0337397 A1* | 11/2019 | Park ........................ | B60L 50/51 |
| 2021/0188279 A1 | 6/2021 | Glavinic et al. | |

FOREIGN PATENT DOCUMENTS

| | | |
|---|---|---|
| EP | 2 868 518 A2 | 5/2015 |
| EP | B 162 606 A1 | 5/2017 |
| EP | 3 216 333 A2 | 9/2017 |
| JP | H07-107772 A | 4/1995 |

OTHER PUBLICATIONS

English Translation (EP 3216333); Paragraphs added for citation purposes (Year: 2025).*

English Translation (No. 342448); paragraphs added for citation purposes. (Year: 2025).*

International Search Report of the European Patent Office dated Jun. 15, 2021 for international application PCT/EP2021/057213 on which this application is based.

English translation and Chinese Office action dated Mar. 12, 2025 for corresponding Chinese application 202180018702.0.

English translation of the Written Opinion of the International Searching Authority dated Jun. 15, 2021 for international application PCT/EP2021/057213 on which this application is based.

* cited by examiner

METHOD AND DEVICE FOR ACTUATING AN ELECTRICAL DRIVE OF A TRAILER VEHICLE

CROSS REFERENCE TO RELATED APPLICATIONS

This application is a continuation application of international patent application PCT/EP2021/057213, filed Mar. 22, 2021 designating the United States and claiming priority from German application 10 2020 108 391.2, filed Mar. 26, 2020, and the entire content of both applications is incorporated herein by reference.

TECHNICAL FIELD

The disclosure relates to the actuation of electric drives in trailer vehicles. For this purpose, the disclosure relates in particular to a method for actuating an electric drive of a trailer vehicle and to devices and vehicles for executing the method. A trailer vehicle is pulled by a towing vehicle, which is, for example, a utility vehicle. Such trailer vehicles (hereinafter also referred to as trailers for short) which are pulled by utility vehicles are, in particular, semitrailers and drawbar trailers.

BACKGROUND

Utility vehicles are known, which, in addition to an internal combustion engine as the primary drive source, additionally have an electric drive for supporting an internal combustion engine. The electric drives in the utility vehicles serve, for example, to enable the internal combustion engine to be operated within an energy efficient speed range or to provide additional thrust, for example when starting or going uphill. Moreover, with electric drives, kinetic and potential energy of the vehicle can be recovered and stored as electric energy in an energy store of the electric drive.

It is moreover known that trailers for utility vehicles can also be equipped with an electric drive in order for the trailer to provide an additional drive force for the towing vehicle, for example when going uphill. In US 2015/0060160, a control unit of the towing vehicle is connected to a further control unit in the trailer so that they communicate. The further control unit, which receives control commands from the control unit, then controls an electric drive in the trailer vehicle.

According to the prior art, it is therefore known that a towing vehicle communicates with a trailer vehicle in order to transmit a drive request from the towing vehicle to the trailer vehicle, for example depending on a gas pedal or brake pedal position. However, the actual behavior of the trailer vehicle and the extent to which the drive of the trailer vehicle is involved in driving a towing vehicle and trailer vehicle combination as a whole could hitherto only be measured using complex sensor equipment. However, this essentially needs to be known, in particular to prevent pushing on the part of the trailer vehicle which can lead to an unstable driving behavior. It is therefore known from the prior art to provide additional sensors on the towing vehicle in order to monitor the actual reaction of a drive of the trailer vehicle and to then regulate the drive, for example, via a control command of the towing vehicle.

Consequently, deceleration or acceleration of the vehicle trailer via its electric drive can only take place iteratively until a correct measured value has been established at the sensor equipment additionally mounted on the towing vehicle in order to prevent unstable driving states. This results in a delayed regulating train for the drive support and also for deceleration, which can be used as recuperation for an electric drive. The consequence is lower efficiency on the one hand, whereas, on the other, the electric drive can provide only limited support, or even no support, in stability-critical situations which are not caused by the electric drive and in which driver assistance systems intervene, for example. In particular, additional components are consequently necessary as a result of the known systems, whereby additional costs are involved and efficient use of the electric drive is not ensured.

SUMMARY

It is an object of the present disclosure therefore to actuate an electric drive of a trailer vehicle in an improved manner compared to the prior art, wherein the actuation should preferably be possible with little or no additional component expenditure and should at the same time enable more efficient targeted use of the drive.

In particular, an object of the present disclosure is to address at least one of the problems mentioned above.

For this purpose, the disclosure relates to a method for actuating an electric drive of a trailer vehicle with a towing vehicle. The method includes: determining a current slip of at least one driven wheel of the towing vehicle pulling the trailer vehicle; determining an expected slip for the at least one driven wheel of the towing vehicle; determining an acceleration demand in dependence upon the determined current slip and the determined expected slip; and, actuating the electric drive via an actuating signal in dependence upon the acceleration demand.

The disclosure accordingly includes a method for actuating an electric drive of a trailer vehicle with a towing vehicle. The method therefore serves to actuate an electric drive.

An electric drive can preferably include at least one electric motor, which can be operated in motor mode or in generator mode. For this purpose, the motor can preferably be connected to an energy store, namely a battery or an accumulator, via a controllable converter. In motor mode, the converter supplies the electric drive with energy from the energy store in order to generate a positive torque. In generator mode, a kinetic energy of a wheel connected to the electric motor is converted into electric energy and this is fed into the energy store via the converter and stored therein. This generator mode is also referred to as recuperation and, at the same time, serves for braking the vehicle with the electric drive.

A towing vehicle in particular includes a utility vehicle here, in particular such as a truck or a tractor. A trailer vehicle, which is also referred to as a trailer for short includes, for example, a semitrailer and a drawbar trailer, such as a center axle trailer or a pony trailer, for example.

According to the method, a current slip of at least one driven wheel of the towing vehicle pulling the trailer vehicle is determined. A current slip of the towing vehicle here includes a drive slip and a brake slip, which describe the ratio of the speed of a driven wheel of the towing vehicle to a non-driven and therefore positively rotating wheel of the towing vehicle or to a reference speed of the vehicle. A slip value, that is, a value of the slip, is therefore greater than zero in the case of a drive slip and less than zero in the case of a brake slip.

The method includes determining the current slip, wherein the determination of the slip can be achieved, for example, by determining existing status values of the towing vehicle and by deriving the slip from these status values or via indirect or direct measurement of the slip.

An embodiment includes determining the slip in that signals of wheel speed sensors of at least one driven and one non-driven wheel are recorded in order to thereby determine a slip by comparing the wheel speeds. According to a further embodiment, the wheel speed of only the driven wheel is compared to a current speed of the vehicle, which can also be referred to as the reference speed. Furthermore, according to the method, an expected slip for the wheel of the towing vehicle, the current slip of which was previously determined, is determined. The expected slip here denotes, in comparison with the current slip, a slip of the wheel, in particular, which is usually expected at the driven wheel for the prevailing operating status and/or driving status of the vehicle. A value of the expected slip is therefore preferably not a directly measured value, but rather a value calculated or estimated from available real measured values, wherein this includes the fact that at least one current measured value or value indicating the current operating status or driving status is taken into account when determining the expected slip. The measured values, from which the expected slip is calculated or depending on which the expected slip is estimated, preferably include determined or estimated coefficients of friction and/or tire condition information such as tire pressure and/or age of the tires and/or tire size and/or condition of the tires. Alternatively or additionally, a slip of a drive wheel in the towing vehicle can also be measured in order to determine the expected slip if the towing vehicle is at a specific position. The following trailer vehicle reaches the specific position a short time later, in which case it can then be assumed that a drive wheel of the trailer vehicle has the same slip at the specific position. The same applies to slip differences of the drive wheels of the towing vehicle which are measured at the specific position and, when the trailer vehicle reaches the specific position, can likewise be assumed for the drive wheels of the trailer vehicle. The expected slip is therefore preferably derived from the measured slip of the towing vehicle. The expected slip preferably relates to the slip which is expected for a towing vehicle if the latter is operated without a trailer vehicle.

Furthermore, an acceleration demand is determined depending on the current slip and the expected slip and the electric drive of the trailer vehicle is then actuated depending on the acceleration demand, in particular in order to generate a positive torque or a negative torque using the electric drive, specifically, in particular, the electric motor or the electric motors.

Thanks to the fact that a current slip, that is, an actual slip, and additionally an expected slip, that is, a calculated theoretical slip, of a driven wheel of the towing vehicle are taken into account by a drive, in particular an additional drive, of the trailer vehicle in order to determine an acceleration request in the form of an acceleration demand, allowance is made for the fact that, if a discrepancy arises between the current slip and the expected slip, this difference can be attributed, in particular, to the presence or coupling of a trailer vehicle which, as a result of its mass, increases the current slip with respect to an expected slip in the event of acceleration and reduces the current slip with respect to an expected slip in the event of deceleration, that is, during braking. This statement is made against the background of the brake slip being defined with a negative value in comparison with a drive slip having a positive sign.

The difference between the current slip and the expected slip of the towing vehicle therefore results in an acceleration demand being able to be generated for the electric drive of the trailer vehicle in such a manner that, depending on the actual mass of the trailer vehicle, an additional drive or brake torque can be generated using the electric drive in such a manner that the additional mass of the trailer vehicle has substantially no or only a slight influence on the acceleration or braking properties of the towing vehicle. In particular, pulling or pushing of the trailer vehicle is therefore decreased or reduced without additional sensors having to be arranged, for example in the region of the tow bar or coupling between the towing vehicle and the trailer vehicle, in order to monitor the behavior of the trailer vehicle. In contrast, sensor equipment for determining the current slip is present in current vehicles anyway, with the result that it is possible to resort to the existing sensor equipment and additional sensor equipment and therefore additional components can be dispensed with. In this case, the method may be carried out in a controller of the towing vehicle, in particular a brake control unit which generally already has current slip values available.

According to a first embodiment, the expected slip is determined depending on the mass of the towing vehicle and additionally or alternatively depending on the mass of the trailer vehicle. For this purpose, the mass of the towing vehicle, and additionally or alternatively the mass of the trailer vehicle, is preferably determined. The mass of the towing vehicle can be derived, that is, determined or measured, for example, from a pressure of existing air springs. The mass of the trailer vehicle can be derived, that is, determined or measured, via a pressure of existing air springs of the trailer vehicle. The mass of the trailer vehicle is preferably known, for example in the trailer vehicle, to a control unit, in particular a trailer brake control unit, of the trailer vehicle and can therefore be transmitted, in the form of a signal or data signal, to a control unit, in particular the brake control unit, of the towing vehicle, which carries out a method according to the disclosure.

Since the expected slip preferably relates solely to the masses of the towing vehicle, that is, the expected slip is defined such that it corresponds to the slip expected when the towing vehicle is operated without a trailer vehicle, it can be determined even more accurately depending on the current loading situation of the towing vehicle and of the trailer vehicle. When the mass of the towing vehicle is either known or measured, the mass of the trailer vehicle may therefore also be additionally or alternatively taken into account in order to improve the expected value. In particular, that proportion of the current slip which can be attributed to the mass of the towing vehicle can therefore also be directly determined as the expected slip from the current slip and the mass distribution. The difference between the current slip and the expected slip can therefore be used as an acceleration demand, for example.

Furthermore, it is also possible to also directly determine the acceleration demand taking into account the current slip and that proportion of the current slip which can be attributed to the trailer vehicle in order to determine the acceleration demand. The expected slip for the towing vehicle is therefore also furthermore determined indirectly since the proportion of the slip which can be attributed to the trailer vehicle corresponds to the difference between the current slip and the expected slip, that is, the expected slip is also determined indirectly. Therefore, the determination of the acceleration demand is also dependent here on the current slip and the expected slip even if the difference between the current slip and the expected slip is used directly to determine the acceleration demand.

According to a further embodiment, the expected slip is additionally determined depending on a slip of at least one driven wheel of the trailer vehicle. The slip of the trailer vehicle therefore preferably relates to a wheel of the trailer vehicle that is driven by the electric drive of the trailer vehicle. The slip is defined relative to a non-driven wheel of the trailer vehicle or of the towing vehicle and to a reference speed.

Also taking into account the slip of the trailer vehicle, which is preferably determined by a control unit, in particular a trailer brake control unit, of the trailer vehicle and is transmitted to the control unit, in particular a brake control unit, of the towing vehicle, means that operation can also be applied to special driving situations which differ from normal driving situations and in which there is a slippery road and a loss of traction, for example. Therefore, without considering the current slip of the trailer vehicle in the case of a slippery road, for example, a very high current slip would be measured if the expected slip is based only on a road which is not slippery. This would lead to a very high difference between the current slip of the towing vehicle and the expected slip and would therefore require a high acceleration from the electric drive. However, as a result of the fact that a comparatively high current slip of the trailer vehicle is also detected in the case of a slippery road, a slippery substrate can be inferred and the expected slip can therefore also be adapted, in terms of the expectation, to this slippery road to the same extent. The difference between the current slip and the expected slip can therefore be kept substantially constant, with respect to a situation in which there is no slippery road, and therefore makes it possible to suitably actuate the electric drive without the risk of the trailer vehicle being pulled or pushed.

According to a further embodiment, the expected slip for the towing vehicle is determined depending on a drive torque generated by a drive of the towing vehicle. The towing vehicle therefore has a drive, for example an internal combustion engine or likewise an electric drive, which generates a current drive torque which is used to determine the current slip. Therefore, a situation with a high acceleration caused by changing a drive torque which can result in an increased slip, for example, can be distinguished for example from a situation in which, for example, the drive torque is substantially constant and a high slip nevertheless occurs, that is, the current slip can be attributed to special road properties or an uphill gradient. The expected slip can therefore be determined more accurately.

According to a further embodiment, the acceleration demand includes a maximum value or a minimum value for a torque to be generated by the electric drive. Accordingly, in the case of an acceleration demand with a positive value, a maximum value for a drive torque to be generated by the electric drive is preferably taken as a starting point and, if the acceleration demand has a negative value, a minimum value for the drive torque to be generated by the electric drive is preferably taken as a starting point. This means that, when increasing the speed or when starting the towing vehicle, for example, an acceleration demand with a maximum value, that is, a positive value, is conveyed to the electric drive. This maximum value is defined as a result of determining the acceleration demand, depending on the current slip and the expected slip, such that, when a drive torque which corresponds to this maximum value is generated by the electric drive, the trailer vehicle does not, or does not yet, push the towing vehicle. In a similar manner, in the event of braking or deceleration, the acceleration demand is provided with a negative minimum value which causes the electric drive to generate a negative drive torque, that is, a brake torque, which is not lower than the value of the acceleration demand signal. Therefore, such a brake torque is thus generated using the electric drive, which substantially prevents the trailer vehicle from pulling or also braking the towing vehicle. The driving stability of the towing vehicle, in particular when cornering, can therefore be further ensured.

According to a further embodiment, the electric drive of the trailer vehicle generates a drive torque depending on an actuating signal. The actuating signal is furthermore generated depending on the acceleration demand and a charge status of at least one energy store of the electric drive.

It is taken into account here that, in the case of an energy store which still has a low charge and an acceleration demand with a positive value, for example, a comparatively low drive torque is generated by the actuating signal compared to when the energy store has a comparatively high or full charge. A certain residual energy in the energy store can therefore be reserved for emergency situations in which the electric drive is needed. Equally, in a case in which the acceleration demand includes a negative value, for example when the charge status of the energy store is comparatively low, a high negative drive torque, that is, a brake torque, is triggered or set by the electric drive as a result of the actuating signal, which contributes to the energy store being charged as quickly or to as great an extent as possible.

According to a further embodiment, the actuating signal is generated depending on at least a current speed of at least one electric motor of the electric drive. In this case, the efficiency of the motor, which depends on the current speed, is taken into account and only when the efficiency is acceptable is the electric drive also used as drive support for the towing vehicle.

According to a further embodiment, a motor speed-torque map is defined in the electric drive, which is preferably adjustable depending on a charge of an energy store of the electric drive. The actuating signal is furthermore generated such that the electric drive generates a drive torque with a value which lies within the map at a given speed. A speed is measured accordingly or determined with the aid of the current operating parameters and, with the aid of the map, a torque is determined which lies within the map and, at the same time, preferably does not exceed a maximum value specified by the acceleration signal, It can therefore be ensured that, via the electric drive, the generated drive torque is always generated with regard to an acceptable efficiency of the electric drive. Accordingly, the motor speed-torque map is preferably defined or predetermined such that it includes drive torques at motor speeds which lie above a predefined efficiency.

According to a further embodiment, the electric drive sends a status signal to the towing vehicle, which signal at least includes the currently generated drive torque of the electric drive. The status signal accordingly includes the signal or a signal derived from the actuating signal, for example.

Upon an acceleration demand or brake request on the part of the driver, depending on the component of the drive torque which is currently generated by the electric drive, the drive of the towing vehicle can generate a drive torque with the towing vehicle which is dependent thereon.

According to a further embodiment, the status signal includes a slip of the vehicle trailer, namely in particular a driven wheel of the vehicle trailer. As already stated above, information relating to the slip of the vehicle trailer serves for determining the expected slip of the trailer vehicle on the one hand but on the other hand also serves to enable the detection of, and a response to, unstable vehicle states of the vehicle trailer.

According to a further embodiment, the method is executed by a brake control unit of the towing vehicle and additionally or alternatively by a brake control unit of the trailer vehicle, namely a trailer brake control unit. The brake control units of the towing vehicle and the trailer vehicle are, in particular, already configured according to the prior art to detect the current slip of individual wheels and therefore serve for particularly easy implementation of the method. The brake control units of the towing vehicle and of the trader vehicle are preferably connected to one another via a CAN bus 11992-2, which is realized via an electrical line. In this case, since it has hitherto not been used as standard, the message EBS 11 can be used for communication, in particular for conveying the acceleration demand.

The disclosure furthermore includes a control unit, in particular of a towing vehicle or a trailer vehicle, for executing a method according to one of the above-mentioned embodiments. The control unit is preferably a brake control unit of the towing vehicle of a brake control unit of the trailer vehicle, which is also referred to as a trailer brake control unit. In the case of a control unit of the towing vehicle, the control unit here is configured to determine the current slip of at least one driven wheel of a towing vehicle pulling the trailer vehicle and an expected slip for the wheel of the towing vehicle. Furthermore, via the brake control unit of the towing vehicle, an acceleration demand is generated depending on the current slip and the expected slip and the acceleration demand is transmitted to a trailer brake control unit to actuate the electric drive. The brake control unit of the towing vehicle is preferably also configured to determine a mass of the trailer vehicle, which is determined by the trailer brake control unit, in order to take this into account when determining the expected slip. The brake control unit of the towing vehicle is furthermore configured to receive the current slip of at least one driven wheel of the trailer vehicle from a trailer brake control unit after this has been determined by the trailer brake control unit.

In the case of a control unit provided as a trailer brake control unit, the control unit is accordingly configured to receive an acceleration demand from the towing vehicle and to thus actuate an electric drive of the trailer vehicle. In particular, such a trailer brake control unit has a memory for a motor speed-torque map in order to generate an actuating signal for the electric drive which is dependent on the acceleration demand and the motor speed-torque map. The trailer brake control unit is moreover preferably configured to send a status signal to a brake control unit of the towing vehicle. The status signal includes a current torque of the electric drive, a mass of the trailer vehicle, at least a slip of at least one wheel of the trailer vehicle and/or the mass of the trailer vehicle.

The disclosure moreover relates to a towing vehicle with a brake control unit, in particular the above-mentioned control unit, for executing a method according to one of the aforementioned embodiments. The disclosure furthermore relates to a trailer vehicle with a trailer brake control unit, in particular with the above-mentioned trailer brake control unit, for executing the method according to one of the aforementioned embodiments. Finally, the disclosure includes a combination including the towing vehicle and the trailer vehicle.

BRIEF DESCRIPTION OF THE DRAWINGS

The invention will now be described with reference to the drawings wherein:

FIG. 3 shows a motor speed-torque map; and.

DESCRIPTION OF THE PREFERRED EMBODIMENTS

Figure 1:
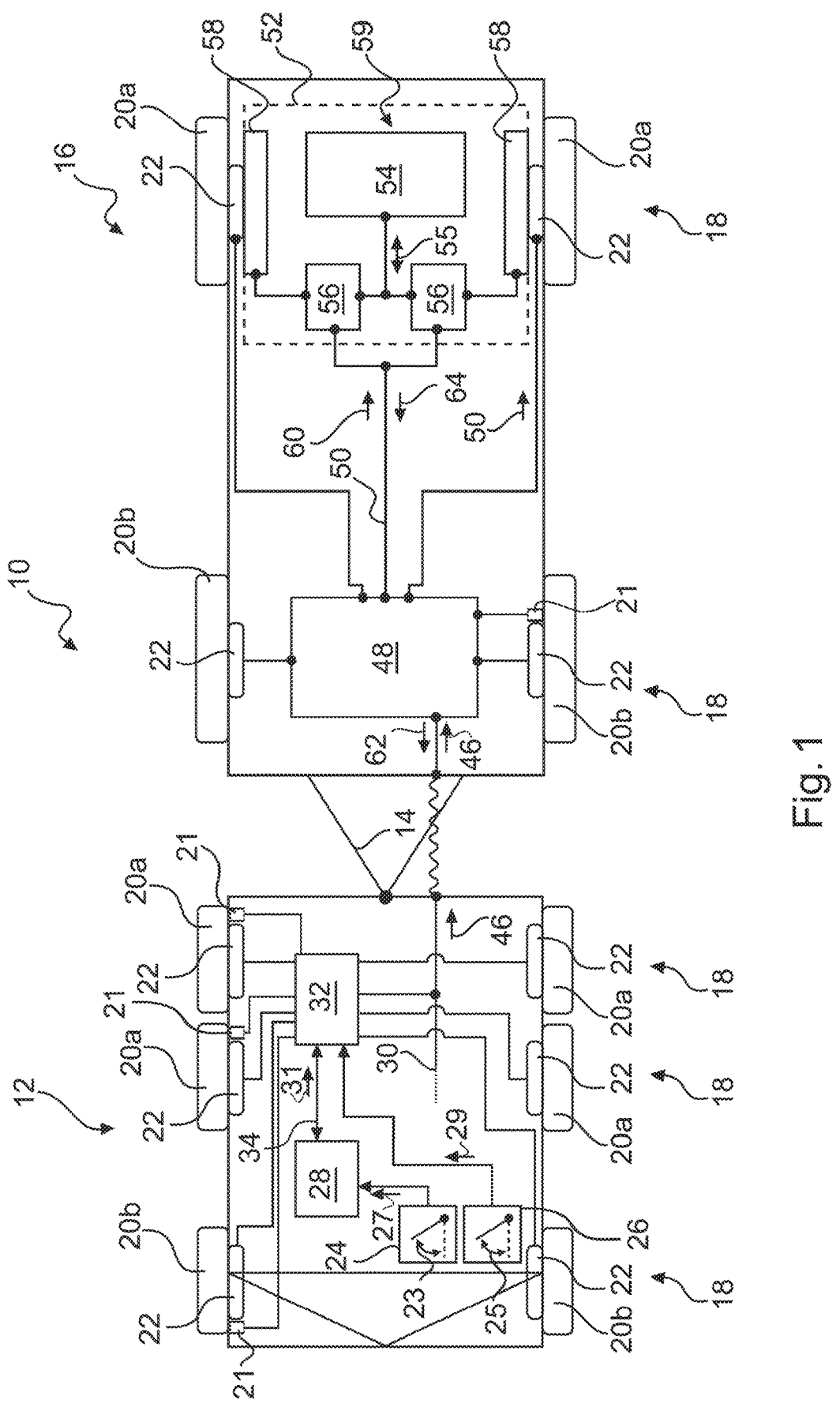
FIG. 1 shows a towing vehicle and trailer vehicle combination.

FIG. 1 shows a vehicle combination 10. The vehicle combination 10 includes a towing vehicle 12, which is, for example, a utility vehicle. The towing vehicle 12 is connected to a trailer vehicle 16 of the vehicle combination 10 via a drawbar 14.

The trailer vehicle 16 can therefore be pulled by the towing vehicle 12. The towing vehicle 12 and the trailer vehicle 16 each include a plurality of axles 18, which each have two wheels 20a, 20b. The wheels 20a are driven wheels and therefore belong to a drive axle 18 and the wheels 20b are wheels without a drive and therefore belong to a non-driven axle 18. In this case, wheels 20b without a drive refer to non-driven wheels. Each of the wheels 20a. 20b is equipped with a friction brake 22 in order to brake the wheels 20a, 20b in the event of a brake request. At least one of the axles 18 of the towing vehicle 12 is driven by an internal combustion engine or an electric drive, wherein an internal combustion engine or an electric drive of the towing vehicle 12 is not illustrated in FIG. 1 for better clarity.

To drive the towing vehicle 12, a request for an increase in speed 27 or a brake request 29 is signaled by an operator of the towing vehicle 12 by varying a gas pedal position 23 of a gas pedal 24 and by varying a brake pedal position 25 of a brake pedal 26. According to an alternative embodiment not illustrated here, the request for an increase in speed 27 or a brake request 29 is generated by a control which controls an autonomous mode or a driver assistance mode.

In the embodiment illustrated here, for signaling purposes, the gas pedal 24 is connected to a vehicle control unit 28 and the brake pedal 26 is connected to a brake control unit 32. The vehicle control unit 28 relays control signals for actuating the drive (not illustrated) to a bus (not illustrated) connected to the vehicle control unit 28. From the request for an increase in speed 27, the vehicle control unit 28 relays a requested positive acceleration 31 and also conveys this to the brake control unit 32 via a connection 34. The brake control unit 32 monitors a current slip of at least one driven wheel 20a. For this purpose, wheel speed sensors 21 are provided on the wheels 20a, 20b. If a differential speed between a driven wheel 20a and a non-driven wheel 20b is detected, the slip is detected in the brake control unit 32. This detection of a slip is indicated as a situation of the towing vehicle 12 in the brake control unit 32 in which a support provided by an additional electric drive of the trailer vehicle 16 would be advantageous. To determine the extent of support, an expected slip is determined in the brake control unit 32 in addition to the current slip, an acceleration demand 46 is generated depending on the current slip and the expected slip and transmitted on a CAN-ISO 11992-2 bus 30. The bus 30 is connected to a trailer brake control unit 48 of the trailer vehicle 16, to which the acceleration demand 46 is conveyed.

An electric drive 52 is furthermore connected via a further bus 50 to the trailer brake control unit 48 which receives the acceleration demand 46 via the bus 30. The electric drive 52 includes an energy store 54, which is rechargeable and can also be referred to as an accumulator. In addition to the energy store 54, the electric drive 52 includes two converters 56, which supply electric motors 58 with the energy from the energy store 54 in order to generate a positive torque. The energy store 54, the converters 56 and the electric motors 58 correspond to components 59 of the electric drive 52. According to an alternative embodiment (not illustrated here), only one electric motor 58 is provided, which also has only one converter 56 and drives two or more wheels 20a via a differential.

The electric motors 58 in FIG. 1 can also be operated in generator mode or regeneratively so that electric energy 55 is fed back into the energy store 54 via the converters 56. The converter 56 of the electric drive 52 is connected to the trailer brake control unit 48 via the further bus 50 in order to receive an actuating signal 60 from the trailer brake control unit 48 which is generated in the trailer brake control unit 48 depending on the acceleration demand 46.

An actuation of the converter 56, which takes place depending on the actuating signal 60, on the one hand specifies whether the electric motors 58 should be operated in generator mode or in motor mode and the torque which should be applied here. When the electric motors 58 are operated in motor mode, this refers to a positive torque, whereas, in the regenerative mode of the electric motor 58, the torque, that s, a value of the torque, is referred or defined as a negative torque.

To actuate the electric drive 52, namely in particular the converters 56, the actuating signal 60 is accordingly sent by the trailer brake control unit 48 to the electric drive 52 via the further bus 50 and, in the present case, two torque values, with which wheel-specific drive torques are generated, are extracted from the actuating signal 60. The electric drive 52 preferably also sends a status signal 64 to the trailer brake control unit 48 so that the trailer brake control unit 48 can, amongst other things, be informed, for example, as to which currently available positive torque or which currently available positive change in torque can be provided by the electric drive 52 at the current time. The currently available torques or changes in torque are, for example, dependent on the current operating status of the electric drive 52. The status signal 64 moreover or alternatively includes the current torque which is generated by the electric motor(s) 58 at the time.

The trailer brake control unit 48 is moreover connected to speed sensors 21, as is the brake control unit 32 of the towing vehicle 12, in order to monitor or determine a slip of at least one driven wheel 20a of the trailer vehicle 16. The trailer brake control unit 48 furthermore sends a status signal 62 to the brake control unit 32 of the towing vehicle 12 in which, on the one hand, the information, or at least some of the information, contained in the status signal 64 is contained. The status signal 62 moreover can preferably also include the slip of the at least one driven wheel 20a of the trailer vehicle 16. This can likewise be taken into account in the brake control unit 32 of the towing vehicle 12 to generate the acceleration demand 46. A mass of the trailer vehicle 16 which is determined in the brake control unit 48 is moreover or alternatively conveyed in the status signal 62 to the brake control unit 32 of the towing vehicle.

Figure 2:
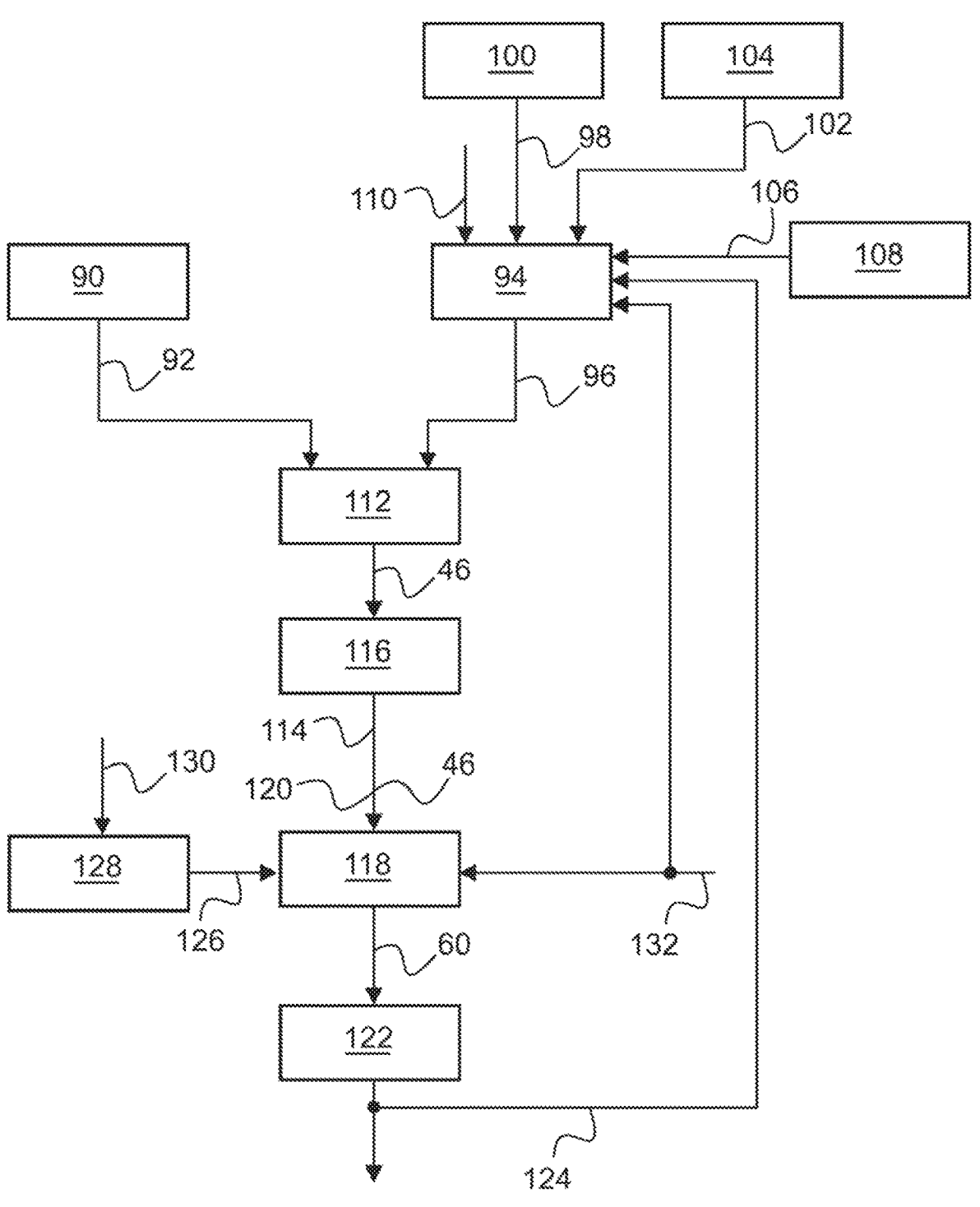
FIG. 2 shows the steps of an embodiment of the method.

FIG. 2 shows the steps of an embodiment of the method. Firstly, in step 90, a current slip 92 of at least one driven wheel 20a of a trailer vehicle 16 is determined. At preferably the same time, in step 94, an expected slip 96 is determined. The expected slip 96 in step 94 is determined depending on a mass 98 of the towing vehicle 12 which is supplied to step 94 and was determined or predefined in preceding step 100, and depending on a mass 102 of the trailer vehicle 16 which was determined in preceding step 104. In addition to the masses 98, 102, a measured or detected slip 106 of the trailer vehicle 16, which was determined in step 108, is likewise supplied to step 94 to determine the expected slip 96. Furthermore, a current drive torque 110 of the drive 52 of the towing vehicle 12 is also taken into account when determining the expected slip 96 in step 94. Alternatively or additionally, according to this or a further embodiment, the expected slip 96 is dependent on an actually determined and/or estimated and/or assumed coefficient of friction and/or tire information and/or tire condition information.

After the determination, the current slip 92 and the expected slip 96 are supplied to step 112 in which an acceleration demand 46 is generated and output as a signal. This acceleration demand 46 is then conveyed to a trailer brake control unit 48 in step 116 and an actuating signal 60 for actuating an electric drive 52 depending on the acceleration demand 46 is generated by the trailer brake control unit 48 in step 118. In this case, the acceleration signal, if it has a positive value, is interpreted as a maximum value 114 or, if it has a negative value, is interpreted as a minimum value 120. Depending on the actuating signal 60, a drive torque 124 is then generated by an electric drive 52 in step 122. To determine the actuating signal 60 in step 118, a motor speed-torque map 126 is supplied to step 118, which map is predefined for the electric drive 52 and stored in the trailer brake control unit 48. Depending on a charge status 130 of an energy store 54 of the electric drive 52, the motor speed-torque map 126 is adapted to the charge status 130 in a step 128.

The actuating signal 60 is furthermore determined in step 118 depending on a speed 132 of at least one motor 58 of the electric drive 52. According to this embodiment, this speed 132 and also the currently generated drive torque 124 are taken into account when generating the expected slip 96 of the towing vehicle 12. By way of example, for this purpose, the currently generated drive torque 124 and the speed 132 are conveyed by the trailer brake control unit 48 to the brake control unit 32 of the towing vehicle 12 in a status signal 64.

Figure 3:
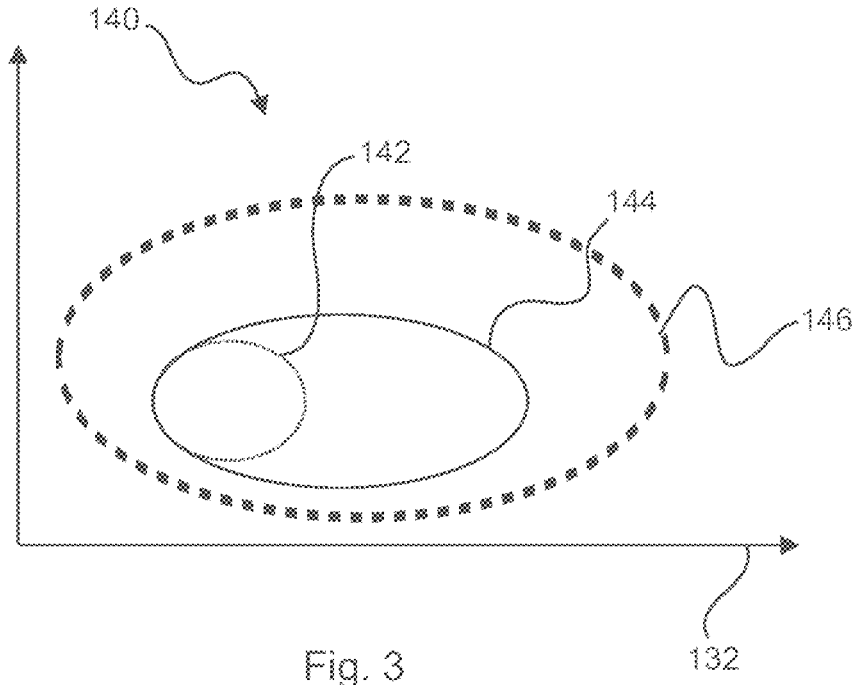

FIG. 3 shows an example of a motor speed-torque map 140, which preferably has a plurality of operating ranges 142 to 146. The fields each include a value range of combinations of the speed 132 of the electric drive 52, which is plotted on the horizontal axis, and torques 124, which are shown on the vertical axis.

A current operating range 142 corresponds to the range within which the electric drive 52 is preferably operated at the time as a result of the actuating signal 60, whilst this current operating range 142 can be adjusted within an optimum operating range 144 depending on the current speed 132. The optimum operating range 144 can in turn vary within a permissible operating range 146 depending on the charge status 130. The map 140 therefore describes ranges of values within which combinations of the motor speed 132 and torque 124 of the electric motor 58 are adjustable and are separate from the remaining range in which the electric motor 58 should or must not be operated.

Figure 4:
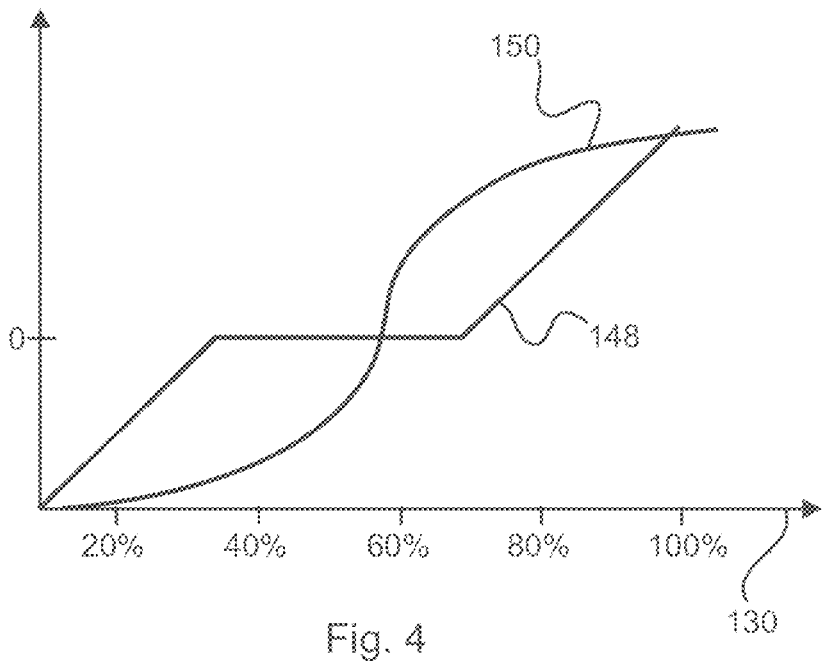
FIG. 4 shows a dependence of the map adjustment on a charge status of an energy store.

FIG. 4 shows a dependence of the map 140 on the charge status 130 of the energy store 54, wherein the charge status 130 is plotted between 0 and 100% on the horizontal axis and an increase or lowering of the optimum operating range 144 with respect to a zero value of the optimum operating range 144 is shown on the vertical axis. An increase or lowering of the optimum operating range can take place either at intervals, as illustrated by the curve 148, or dynamically, as illustrated by the curve 150.

In the present embodiment, between approximately 30 and 80% of the charge status 130 of the optimum operating range 144 is located substantially centrally in the permissible operating range 146 if an adaptation at intervals is assumed. Outside these limits, the optimum operating range 144 is adjusted either upwards or downwards. It is therefore possible to operate the electric drive 52 with a suitable efficiency.

It is understood that the foregoing description is that of the preferred embodiments of the invention and that various changes and modifications may be made thereto without departing from the spirit and scope of the invention as defined in the appended claims.

LIST OF REFERENCE SIGNS AS PART OF THE DESCRIPTION

10 Vehicle combination
12 Towing vehicle
14 Drawbar
16 Trailer vehicle
18 Axles
20a Driven wheels
20b Non-driven wheels
21 Wheel speed sensors
22 Friction brake
23 Gas pedal position
24 Gas pedal
25 Brake pedal position
26 Brake pedal
27 Request for an increase in speed
28 Vehicle control unit
29 Brake request
30 CAN bus
31 Requested positive acceleration
32 Brake control unit
34 Connection
46 Acceleration demand
48 Trailer brake control unit
50 Further bus
52 Electric drive
54 Energy store
55 Energy
56 Converter
58 Electric motors
59 Components of the electric drive
60 Actuating signal
62 Status signal
64 Status signal
90 Step of the method
92 Current slip
94 Step of the method
96 Expected slip
98 Supplied mass of the towing vehicle
100 Step of the method
102 Mass of the trailer vehicle
104 Step of the method
106 Measured slip
108 Step of the method
110 Drive torque
112 Step of the method
114 Maximum value
116-118 Steps of the method
120 Minimum value
122 Step of the method
124 Drive torque
126 Motor speed-torque map

128 Step of the method
130 Charge status
132 Speed
140 Motor speed-torque map
142 Current operating range
144 Optimum operating range
146 Permissible operating range
148 Curve
150 Curve

What is claimed is:

1. A method for actuating an electric drive of a trailer vehicle with a towing vehicle, the method comprising:
   determining a current slip of at least one driven wheel of the towing vehicle pulling the trailer vehicle;
   determining an expected slip for the at least one driven wheel of the towing vehicle;
   determining an acceleration demand in dependence upon the determined current slip and the determined expected slip; and,
   actuating the electric drive via an actuating signal in dependence upon the acceleration demand.

2. The method of claim 1, wherein the expected slip is determined in dependence upon at least one of a mass of the towing vehicle and a mass of the trailer vehicle.

3. The method of claim 2, wherein the at least one of the mass of the towing vehicle and the mass of the trailer vehicle is determined for the determination of the expected slip.

4. The method of claim 1, wherein the expected slip is determined in dependence upon the current slip of at least one driven wheel of the trailer vehicle received from the trailer vehicle.

5. The method of claim 1, wherein the expected slip is determined in dependence upon a drive torque generated by the towing vehicle.

6. The method of claim 1, wherein the acceleration demand corresponds to or comprises a maximum value or a minimum value for a drive torque to be generated by the electric drive.

7. The method of claim 1, wherein the electric drive generates a drive torque in dependence upon the actuating signal; and, the actuating signal is generated in dependence upon the acceleration demand and a charge status of an energy store of the electric drive.

8. The method of claim 1, wherein the actuating signal is generated in dependence upon at least a current speed of at least one electric motor of the electric drive.

9. The method of claim 1, wherein a motor speed-torque map is specified; and, the actuating signal is generated such that the electric drive generates a drive torque which lies within the motor speed-torque map at the current speed of the electric motor.

10. The method of claim 9, wherein the motor speed-torque map is adjustable in dependence upon a charge status of an energy store of the electric drive.

11. The method of claim 9, wherein the drive torque generated by the electric drive is within an optimum range of the motor speed-torque map.

12. The method of claim 1, wherein the electric drive sends a status signal to the towing vehicle; and, said status signal includes a drive torque currently generated by the electric drive.

13. The method of claim 12, wherein the status signal includes the current slip of at least one driven wheel of the trailer vehicle.

14. The method of claim 1, wherein the method is executed by at least one of a first brake control unit of the towing vehicle and a second brake control unit of the trailer vehicle.

15. A control unit comprising:

a processor;

a computer readable storage medium having stored thereon program code for actuating an electric drive of a trailer vehicle with a towing vehicle;

said program code being configured, when executed by said processor, to:

determine a current slip of at least one driven wheel of the towing vehicle pulling the trailer vehicle;

determine an expected slip for the at least one driven wheel of the towing vehicle;

determine an acceleration demand in dependence upon the determined current slip and the determined expected slip; and, actuate the electric drive via an actuating signal in dependence upon the acceleration demand.

16. The control unit of claim 15, wherein the control unit is a brake control unit or a trailer brake control unit.

17. The control unit of claim 15, wherein the control unit is a control unit of the towing vehicle or of the trailer vehicle.

18. A towing vehicle comprising the control unit of claim 15, wherein the control unit is a brake control unit.

19. A trailer vehicle comprising the control unit of claim 16, wherein the brake control unit is a trailer brake control unit.

20. A vehicle combination, comprising a towing vehicle and a trailer vehicle, wherein each of said towing vehicle and said trailer vehicle include the control unit of claim 15, wherein said control unit of said towing vehicle is configured as a towing vehicle brake control unit and said control unit of said trailer vehicle is configured as a trailer vehicle brake control unit.

* * * * *